United States Patent [19]
Scerbak et al.

[11] Patent Number: 4,827,485
[45] Date of Patent: * May 2, 1989

[54] DIODE PUMPED SOLID STATE LASER

[75] Inventors: David G. Scerbak, Morgan Hill; Leonard P. Pearson, Palo Alto; John A. Dutcher, Mountain View, all of Calif.

[73] Assignee: Lightwave Electronics Corp., Mountain View, Calif.

[*] Notice: The portion of the term of this patent subsequent to Mar. 29, 2005 has been disclaimed.

[21] Appl. No.: 871,492

[22] Filed: Jun. 6, 1986

[51] Int. Cl.⁴ .................................................. H01S 3/08
[52] U.S. Cl. ........................................ 372/107; 372/36; 372/75; 372/101
[58] Field of Search .................... 372/107, 108, 75, 92, 372/71, 72, 6

[56] References Cited

U.S. PATENT DOCUMENTS

| | | | |
|---|---|---|---|
| 4,003,074 | 1/1977 | Yonezu et al. | 372/44 |
| 4,504,950 | 3/1985 | Au Yeung | 372/20 |
| 4,553,238 | 11/1985 | Shaw et al. | 372/66 |
| 4,617,667 | 10/1986 | Penn | 372/35 |
| 4,653,056 | 3/1987 | Baer et al. | 372/27 |
| 4,665,529 | 5/1987 | Baer et al. | 372/107 |
| 4,734,912 | 3/1988 | Scerbak et al. | 372/108 |
| 4,739,507 | 4/1988 | Byer et al. | 372/71 |

OTHER PUBLICATIONS

Washio et al., "Room Temperature Cw Operation of An Efficient Miniaturized Nd:YAG Laser End—Pumped by a Supe—Lum. Diode", Appl. Phys. Lett., vol. 29, No. 11, 1 Dec. '76.

Primary Examiner—Leon Scott, Jr.
Attorney, Agent, or Firm—Harry E. Aine

[57] ABSTRACT

A diode pumped Nd:YAG laser is disclosed wherein the YAG laser rod is supported from the envelope of the pumping diode by means of telescoping glass tubes bonded together by means of u.v. curing adhesive. The diode pumped laser is supported from a heat sink via the intermediary of a pair of rotatable wedges for adjusting the tilt of the optical axis of the laser. A gradient refractive index lens focuses the pump radiation into the laser rod. The lens is adhered directly to the output window of the pump diode by means of refractive index matching adhesive.

10 Claims, 2 Drawing Sheets

Fig_1

4,827,485

DIODE PUMPED SOLID STATE LASER

BACKGROUND OF THE INVENTION

The present invention relates in general to diode pumped solid state lasers and, more particularly, to an improved laser and method of making same.

DESCRIPTION OF THE PRIOR ART

Heretofore, diode end-pumped Nd:YAG lasers have been proposed. One such laser utilized a GaAlAs laser diode pump producing an optical pumping beam of a wavelength of 809 nanometers focused by means of a gradient refractive index lens (Selfoc) into a Nd:YAG laser rod for optically pumping the rod. The laser rod had mirrors formed on opposite ends thereof for defining the optical resonator containing the laser rod. The polarization of the output power of the YAG laser was indeterminate unless a small amount of stress was applied transversely to the laser rod. The polarization of the output beam at 1,064 nanometers was reported to be always parallel, never perpendicular to the applied stress.

It is also known from the prior art, in the case of an arrangement for focusing the output of a diode laser to a desired focal point, to employ a gradient refractive index lens disposed adjacent the laser diode on the optical axis. In such a case, the gradient refractive index lens was centrally mounted of a relatively heavy cylindrical support bracket carried from the envelope of the laser diode. Such a laser diode is commercially available from PA Technology of Highstown, N.J., as a NEC Custom manufacture based on Model NDL 3002 laser diodes with Selfoc lenses.

Thus, it is desired to obtain a laser diode end-pumped Nd:YAG laser producing single-mode power at 1,064 nanometers at power levels well above 8 microwatts c.w..

SUMMARY OF THE PRESENT INVENTION

The principal object of the present invention is the provision of an improved diode end-pumped solid state laser and method of making same.

In one feature of the present invention, a diode pumped solid state laser is fabricated by supporting the solid state lasant material, which is to be optically pumped, relative to the diode optical pump via the intermediary of a pair of coaxial telescoping tubes, adjusting the amount of axial overlap of the tubes to position the solid lasant material relative to the diode and bonding the overlapping tubes together to fix the position of the solid lasant material relative to the diode pump, whereby the diode pump is held in rigidly fixed position relative to the solid lasant material.

In another feature of the present invention, the pair of overlapping and telescoping tubes are bonded together by means of a u.v. curing adhesive such that precise adjustment can be made while the parts are held together by the uncured adhesive and then the adhesive cured by applying ultraviolet radiation to obtain a rigid, composite structure.

In another feature of the present invention, the telescoping tubes are made of a thermally insulative material, such as glass, to obtain thermal isolation between the diode pump and the device being pumped.

In another feature of the present invention, a gradient, refractive index lens is directly adherent to the output window of the diode pump, whereby the thermal mass of the gradient index lens and its mount is reduced in use.

In another feature of the present invention, the gradient refractive index lens is bonded to the window of the diode pump by means of adhesive having a certain index of refraction for matching the index of refraction of the lens to that of the window, whereby unwanted reflection of pumping power from the input face of the lens is reduced in use.

In another feature of the present invention, a diode pumped solid state laser is cooled by means of a thermoelectric cooler coupled in heat-exchanging relation with the diode pump and the laser is mounted to a heat sink structure via the intermediary of a tilting mechanism for adjusting the axis of the output beam of the laser, such tilting structure including a rotatable, slidably mating planar interface with the normal to the plane of the interface being inclined and at an angle to the axis of revolution of one of the rotatable members at the interface such that by rotating one of the mating faces relative to the other, the orientation of the optical axis of the output beam of the laser is adjusted, whereby a high thermal conductivity path is provided from the thermoelectric cooler to the heat sink through the tilting structure.

In another feature of the present invention, the rotatable interface of the tilting structure includes a ball captured in hemispherical recesses in the mating faces for preventing rectilinear translation of the mating faces, one with respect to the other in the plane of the interface.

In another feature of the present invention, a spring structure is provided for spring biasing the mating planar faces of the tilting structure into slidable contact, one with respect to the other.

In another feature of the present invention, the tilting structure includes a pair of wedges defining the mating interface therebetween said wedges being pivotably supported for rotation about their respective axes of revolution.

DESCRIPTION OF THE PREFERRED EMBODIMENTS

Figure 1:
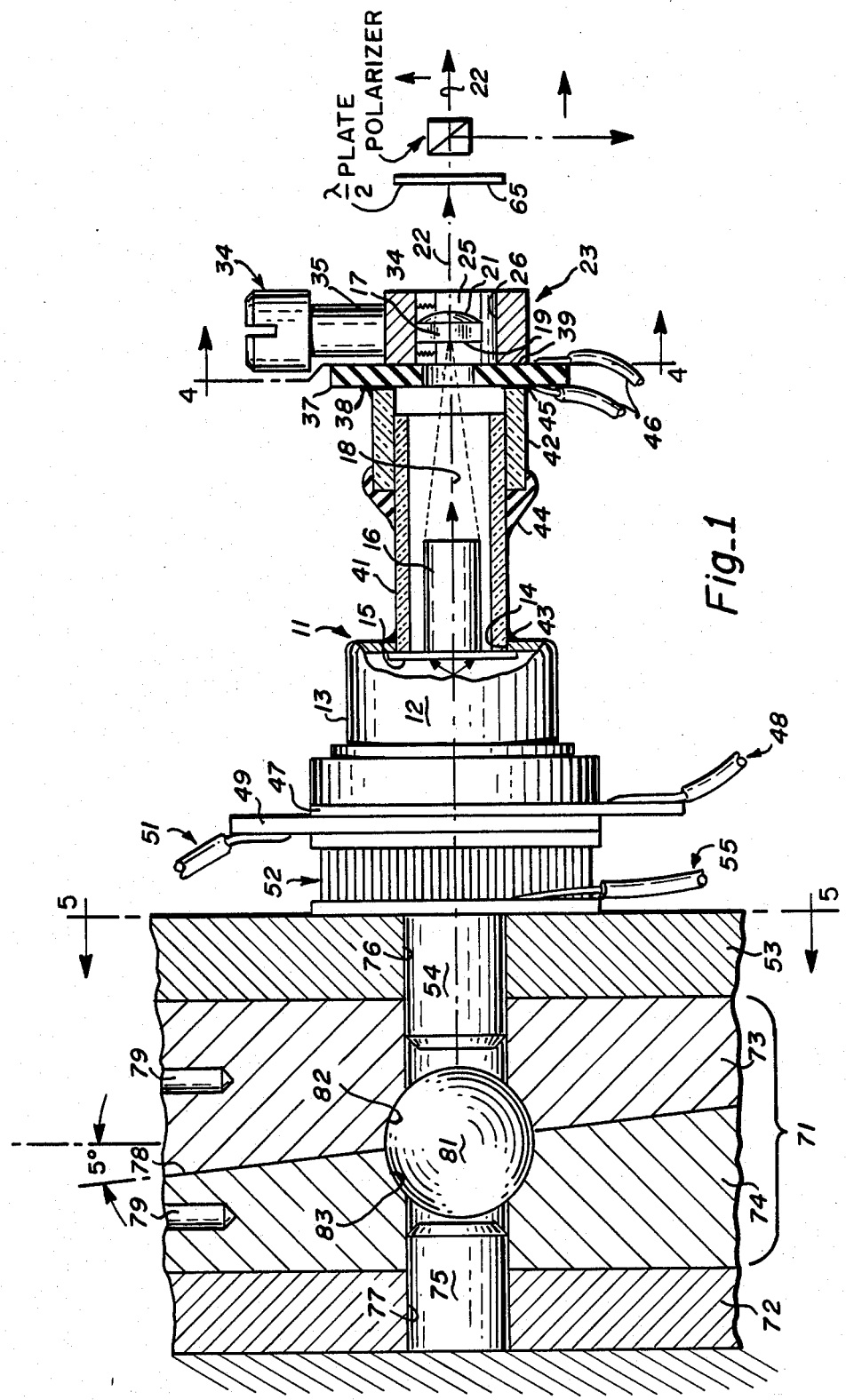
FIG. 1 is a side, elevational view, partly in section and partly schematic of a laser diode end-pumped laser incorporating features of the present invention.

Referring now to FIG. 1, there is shown a laser-diode-end-pumped Nd:YAG single-mode laser 11 incorporating features of the present invention. The laser 11 includes a laser diode pump 12, such as a Model LT030Md GaAlAs laser diode commercially available from Sharp which produces an output beam of laser radiation at a wavelength of 750 nanometers with a typical output power of approximately 5 milliwatts. The laser diode 12 includes a metallic envelope 13 centrally apertured at 14 with the aperture 14 being closed over by means of a thin, optically transparent membrane 15 forming an output window.

A Selfoc or gradient index lens 16 is cemented directly to the membrane 15 by means of a thin film of refractive index matching adhesive, such as u.v. curing optical cement Model No. 61, commercially available from Norland Products, Inc. of New Brunswick, N.J.. The optical cement has a refractive index n=1.5 and index matches the refractive index of the membrane n=1.48 to the refractive index n=1.6 of the gradient index lens 16. In a typical example, the Selfoc lens 16 is a Model SLH-1. 8-0.22P, commercially available from NSG of America. The index matching avoids reflection of pumping radiation from the input face of the lens 16 and avoids the use and expense of an antireflection coating on the input face of the lens 16. Also, affixing the lens 16 directly to the window reduces the thermal mass of the lens 16 and its mount which facilitates cooling of the diode 12 and its associated parts.

The Selfoc lens 16 focuses the image of the source of the laser diode 12 onto the input planar face of a short length of a rod 17 of generally non-birefringent lasant material such as Nd:YAG disposed on the optical axis 18. In a typical example, the rod 17 of lasant material has a diameter of 2 millimeters and a length of 1 millimeter and is coaxially arranged with the output beam of the pump 12 and the Selfoc lens 16, and is on the optical axis 18 of the laser 11.

An optical resonator is formed by coating opposite ends of the rod 17 of lasant material with reflective coatings at 19 and 21. The reflective coating 19 on the input face of rod 17 has a high reflectivity at 1.06 microns, i.e., it has a reflectivity greater than 99.9% and is optically transmissive at the pump wavelength of 750 nanometers, i.e., it is greater than 85% transmissive at that wavelength. The mirror coating 21 on the output face of the rod 17 is coated to be 0.75% transmissive at the output wavelength of 1,064 nanometers such that a small percentage of the resonant optical radiation within the rod 17 is coupled out of the optical resonator defined by mirrors 19 and 21 as an output beam 22. The output mirror 21 on the rod 17 has a radius of curvature as of 10 millimeters. It is outwardly domed or concave in shape facing into the rod 17 for focusing the optical radiation within the rod 17 back toward the opposing mirror 19. The optical resonator is coaxial with the optical axis 18, whereby the conversion efficiency is increased.

Figure 4:
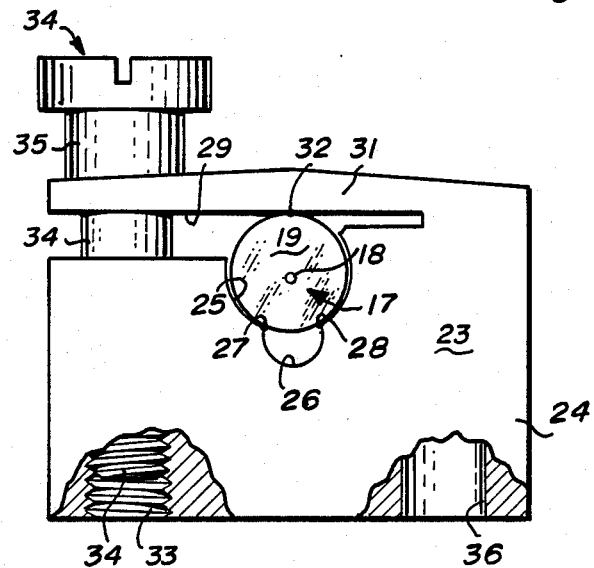
FIG. 4 is an end view, partly in section of a portion of the structure of FIG. 1 taken along line 4—4 in the direction of the arrows.

Referring now to FIGS. 1 and 4, the lasant rod 17 is held within a clamp assembly 23 made of a spring material having a spring constant with a low temperature coefficient, such as beryllium copper. The clamp 23 includes a central body portion 24 having an axially directed bore 2 to receive the rod 17 coaxially thereof. The inside diameter of the bore 25 is slightly greater than the outside diameter of the rod 17 and a smaller diameter relief bore 26 extends parallel to bore 25 and intersects therewith to provide a pair of bearing lines 27 and 28 at the intersecting corners of bores 25 and 26 and bearing upon the rod 17 in relatively close proximity along one side edge thereof. In a typical example, the block 24 is 0.310" wide, 0.100" thick, and 0.225" high. The bore 25 has a diameter of 0.081". Bore 26 has a diameter of 0.040". The axis of bore 26 is coincident with the wall of bore 25.

The clamp body 24 is transversely slotted at 29 to define a cantilever lever portion 31 which bears against the rod 17 along a line 32 of tangency generally diametrically opposed and inbetween bearing lines 27 and 28. The block 24 includes a tapped transverse bore at 33 to receive a screw 34. The screw 34 includes a shaft having a shoulder portion 35 bearing against the end of the bored cantilever member 31. By adjusting the screw 34, more or less transverse stress is applied to the rod 17 by means of the cantilever 31 and bearing points 27 and 28. A second transverse bore 36 is provided in the body 24 to receive a thermistor for sensing the temperature of the clamp 23. In a typical example, the slot 29 is 0.030" wide and the cantilever 31 has a thickness of 0.020" and a length of 0.250".

The clamp 23 is epoxied to a centrally apertured mounting plate 37 as of alumina ceramic and a thick-film resistor 38 is deposited on the mounting plate 37 for heating the plate 37 and clamp 23 to a desired operating temperature. The clamp 23 is affixed to the plate 37 by a suitable adhesive such as thermally conductive epoxy at 39.

The mounting plate 37 is secured to the envelope 13 of the laser diode 12 pump via the intermediary of a pair of coaxial telescoping axially overlapping Pyrex glass tubes 41 and 42. Glass tube 41, as of 5.4 mm in length and 3.5 mm outside diameter, is affixed as by u.v. curing epoxy adhesive to the inner lip of the central aperture 14 in the envelope 13 of the diode 12 at 43. Glass tube 42, as of 5.4 mm in length and 3.51 mm inside diameter, is coaxially mounted of and bonded to glass tube 41 by means of a u.v. curing epoxy seal at 44. Similarly, glass tube 42 is bonded to the mounting plate 37 via similar epoxy at 45. In a typical example, Pyrex glass tube 41 has a wall thickness of 0.25 millimeters and is commercially available from Vitro Dynamics of Rockaway, N.J., likewise Pyrex glass tube 42 is commercially available from the same source and has a wall thickness of 0.3 millimeters. Heating current for driving the thick film heater 38 is applied to pads on the mounting plate 37 via leads 46.

To properly align and position the YAG rod 17 relative to the diode pumping source 12, the subassembly including the diode 12, Selfoc lens 16, and telescoping tube 41 is held in a jig fixture. Also, the other subassembly including the clamp 23, plate 37 and telescoping tube 42 is placed in the jigging fixture. The degree of axial overlap between the telescoping tubes 41 and 42 is then adjusted so as to focus the image of the diode source of the diode 12 onto the input face of the rod 17. Also, the subassemblies are transversely positioned so that the image of the source falls on the optical axis 18 as it passes through the center of the rod 17. A seam of u.v. curing adhesive 44 is then applied between the two telescoping tubular members 41 and 42 and while the assembly is held in the jigging fixture, the joints at 43, 45 and 44 are irradiated with ultraviolet radiation to cure the epoxy joints and to form a rigid composite assembly having the proper position and alignment.

The laser diode 12 is mounted to a ceramic mounting plate 47, as of alumina, having metallized leads thereon for making electrical connections to the diode 12 via leads 48. Ceramic mounting plate 47 is bonded to a second ceramic plate 49 having a thermistor mounted thereon for sensing the temperature of the diode 12. An electrical connection is made to the thermistor via leads 51. A thermoelectric cooler 52, such as a Model FC 0.45-66-05L commercially available from Melcor of Trenton, N.J., is disposed inbetween the thermistor carrying ceramic plate 49 and a mounting plate 53 as of aluminum. The thermoelectric cooler 52 has its cold junction facing the ceramic plate 49 and diode 12 for cooling the diode 12 in use. Typically, the cold junction of the thermoelectric cooler is maintained within the temperature range of 10 to 15 degrees C. The hot junction faces the mounting plate 53, current is fed to the thermoelectric cooler 52 via leads 55.

Figures 5, 6:
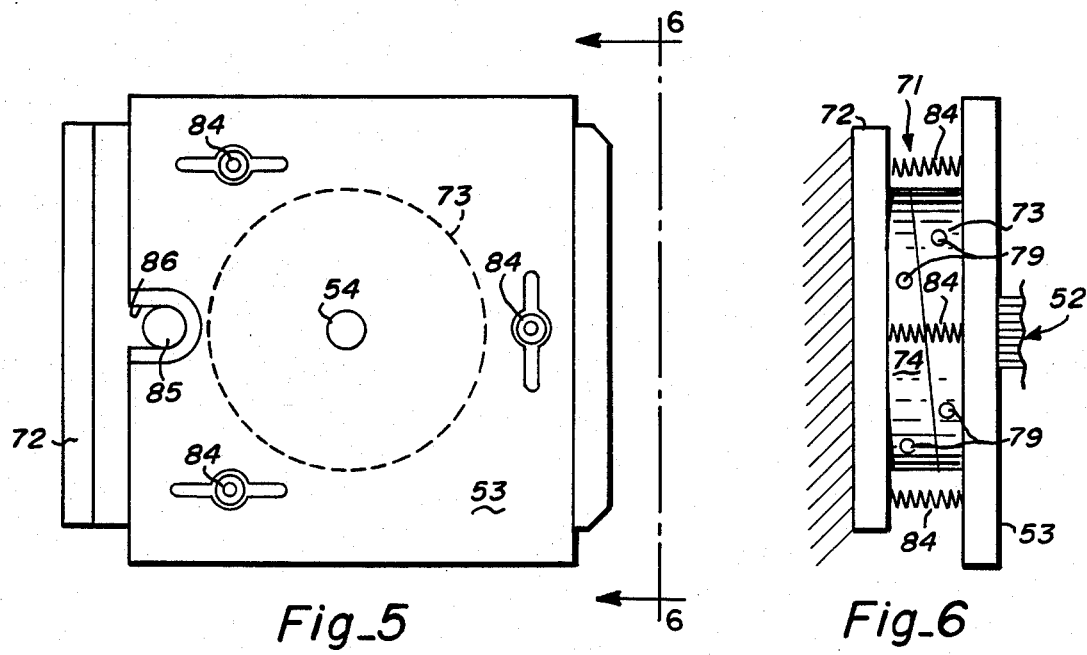
FIG. 5 is a plan view of a portion of the structure of FIG. 1 taken along line 5—5 in the direction of the arrows.
FIG. 6 is a side elevational view of the structure of FIG. 5 taken along line 6—6 in the direction of the arrows.

A tilting structure 71 is disposed intermediate the mounting plate 53 and a heat sinking plate 72 affixed to a heat sink. The tilting structure 71 (See FIGS. 1, 5 and 6.) include a pair of disc shaped wedge members 73 and 74, as of aluminum, each pivotably carried from its adjacent plate 53 and 72 via the intermediary of a slip-fit on axles 54 and 75, respectively, which are fixedly secured to the respective plates 53 and 72 via press fits at 76 and 77.

The wedge shaped members 73 and 74 include a mating planar interface 78 inclined at an angle, as of 5 degrees, relative to a plane normal to the axis of revolution of member 74 on axle 75. Radially directed bores 79, circumferentially spaced apart as by 90 degree intervals, are provided in the wedges to receive pins for rotating the wedge shaped members 73 and 74. A ball-bearing 81 is centrally disposed of the two wedges 73 and 74 essentially on the axis of rotation thereof and captured between a pair of hemispherical recesses 82 and 83 in the respective wedges 73 and 74. The captured ball-bearing 81 allows relative rotation of the wedges 73 and 74 with respect to each other but prevents rectilinear translation of the wedges 73 and 74 in the interface plane 78.

Three tension springs 84 interconnect the two plates 53 and 72 for compressing the wedges 73 and 74 together at their interface 78.

An axially directed pin 85 is carried from the heat sinking plate 72 and is received within a notch 86 in the edge of the mounting plate 53. The lip of the notch 86 is beveled so as to provide a knife-edge bearing against the pin 85 to allow for tilting of mounting plate 53 relative to the heat sinking plate 72. The pin 85 prevents rotation of mounting plate 53 relative to heat sinking plate 72 when the wedges 73 and 74 are rotated for tilting the optical axis of the laser 11.

A thermally conductive grease is applied to interface 78 and to the interfaces between the wedges and their respective plates 53 and 72.

In operation, the tilting assembly 71 provides an adjustment of the orientation of the optical axis 18 relative to the axis of revolution of the pivot 75 of twice the inclination angle of 5° to 10°. This tilting adjustment is particularly advantageous when it is desired to align the output beam 22 of the laser with other optical elements such as those that may be utilized in a laser injection seeding system. Such a system is described in an article entitled: "Diode-Laser-Pumped Nd:YAG Laser Injection Seeding System", appearing in Applied Optics, Vol. 25, No. 5 of March 1986, pgs. 629–633. Thus, in operation the tilting structure 71 allows tilting of the optical axis of the laser relative to its heat sinking support structure while maintaining good thermal conductivity between the hot face of the thermoelectric cooler 52 and the heat sink.

Figure 2:
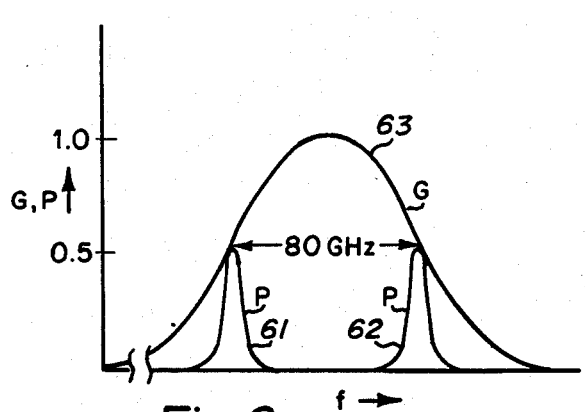
FIG. 2 is a plot of normalized gain, G, for the optically pumped solid lasant material as a function of wavelength and also including a plot of the normalized power of the two nonpolarized resonant axial modes, as a function of wavelength for the unstressed lasant material in the laser of FIG. 1.

In operation, approximately 100 milliwatts of d.c. input power is fed to the laser diode pump 12 to produce between 5 and 8 milliwatts of single-mode output power from laser diode pump 12 at 750 nanometers. This pump radiation is collected by the Selfoc lens 16 and focused onto the input face 19 of the YAG rod 17. With no stress applied to the laser rod 17 and with the laser rod 17 being dimensioned to be sufficiently short, i.e., on the order of 1 millimeter in length, only two axially resonanat modes of oscillation will be supported (lase) within the optical resonator. These resonant modes of oscillation are shown in FIG. 2 at 61 and 62 and have a frequency separation of approximately 80 gigahertz, corresponding to adjacent axial modes of oscillation within the optical resonator. These lasing modes of oscillation 61 and 62 are not polarized and are disposed on opposite sides of the center of the gain profile curve 63 for the Nd:YAG laser rod. Half power points on the gain curve for the laser rod 17 are approximately 120 gigahertz apart as pumped from the laser diode 12 with the aforedescribed power levels.

Figure 3:
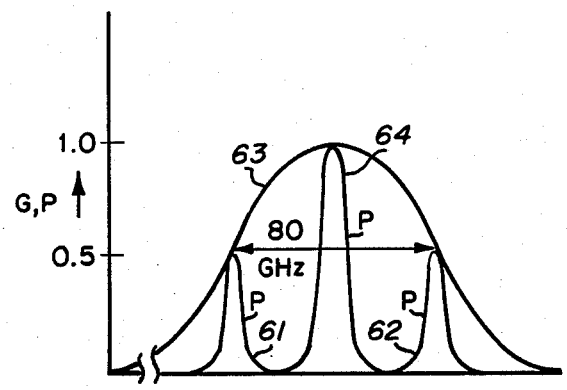
FIG. 3 is a plot similar to that of FIG. 2 showing the condition obtained when the lasant material is transversely stressed and the intensity of the stress is adjusted for centering the wavelength of the third resonant mode midway between the wavelengths of the other two orthogonally polarized axial modes of resonance for the laser of FIG. 1.

When the screw 34 is tightened to produce predominantly a transverse stress on the laser rod 17, the two resonant modes 61 and 62 become linearly polarized in a direction orthogonal to the direction of the stress and a third resonant mode of oscillation arises as shown at 64 in FIG. 3. This third resonant mode of oscillation 64 has a linear polarization parallel to the direction of the transverse stress and orthogonal to the polarization of the two other modes of oscillation, namely, 61 and 62. The stress is adjusted to center the frequency of the third mode of oscillation 64 midway between the frequencies of the two other modes of oscillation 61 and 62 and preferably at the peak (1,064 nm) of the gain curve 63 such that the power in the third mode 64 is greater than that in either of the two other orthogonal modes 61 and 62.

The output beam 22 from the laser 11 is thence fed through a one-half wave plate 65 which is rotatable about the optical axis 18 of the laser to rotate the orientation of the orthogonal linearly polarized modes 61, 62 and 64 in a plane normal to the optical axis 18. A linear polarizer 66 is disposed on the optical axis 18 to receive the output beam 22 from the halfwave plate 65. The halfwave plate 65 is rotated relative to the polarizer 66 so as to bring the polarization of the third resonant mode 64 into alignment with one of the axes of the polarizer 66 so as to separate the radiation in the third resonant mode 64 from the radiation in the other two orthogonal modes 61 and 62.

The third mode linearly polarized radiation at 1,064 nm then serves as the output beam 22. In a typical example, the output beam 22, at the output of the polarizer 66, has approximately 200 microwatts of $TEM_{001}$ radiation at 1.06 microns or 1,064 nanometers. This radiation is also single-mode consisting of the single axial mode 64. The radiation is also tunable by varying the temperature of the resonator and the laser rod 17 by adjusting the heating current supplied to the thick film heater 38 via leads 46. The temperature of the laser rod 17 is detected or sensed by the thermistor mounted within the bore 36 in the clamp 23. When the output frequency of the laser 11 is tuned, thermally, the three resonant modes 64, 61 and 62 tune together and their frequency separation is maintained even though the center frequency is shifted or tuned thermally. Similarly, the output wavelength of the laser diode pump 12 is thermally tuned by controlling the temperature of the diode 12 by means of the power fed to the thermoelectric cooler 52. The diode temperature is sensed by the thermistor carried from plate 49. The diode pump 12 is thermally tuned to maintain the gain profile centered at the laser output wavelength.

In a typical example, the halfwave retardation plate 65 is commercially available as Model WP-2-050-106-LM-M2 from Virgo Optics, Inc. of Port Richey, Fla. and the polarizer 66 comprises a thin film polarizer Model TFP-29R-1.06 which is supported on a post at Brewster's angle and is commercially available from Northwest Optical, Inc. of Burleigh Park, Fishers, N.Y.

The laser 11 of FIG. 1 is potted in a thermally insulative epoxy foam, not shown, to provide thermal isolation and to increase the strength of the assembly. Also, the glass tubes 41 and 42 between the heated clamp 23 and the cooled diode 12 provide thermal isolation therebetween.

The advantage of the laser 11 of the present invention is that its fabrication is simplified by the provision of the telescoping thermally insulative tubes 41 and 42 supporting the lasant material 17 from the pump 12, such tubes being bonded together by means of a u.v. curing adhesive to simplify fabrication of the laser. In addition, the thermal mass of the pumping diode 12 and lens 16 is reduced by bonding the gradient refractive index lens 16 directly to the output window 15 of the diode pump 12. And, lastly, the thermally conductive tilting structure 71 disposed inbetween the thermoelectric cooler 52 and the heat sink 72 allows for adjustment of the optical axis 18 of the laser while maintaining good thermal conductivity between the thermoelectric cooler 52 and the heat sink 72.

What is claimed is:

1. In a method for fabricating a diode pumped solid state laser of the type in which the diode optical pump includes a semiconductor diode source of the optical pumping radiation and contained within an apertured enclosure with the optical pumping beam being emitted from the source through the aperture in the enclosure and including an optically transmissive window member closing over said aperture in the enclosure, the steps of:
  mounting a member of solid lasant material in the beam path of the diode optical pump for optically pumping the lasant material; and
  mounting a gradient refractive index lens directly onto said window member for focusing an image of the pumping diode source onto said solid lasant material, whereby the thermal mass of said gradient index lens and its mount is reduced.

2. The method of claim 1 wherein the steps of mounting said gradient refractive index lens directly onto said window member comprises the step of, bonding the lens to the window by means of an optically transparent adhesive.

3. The method of claim 2 including selecting the index of refraction of the adhesive to have a value in between the value for the index of refraction of the window member and that of the gradient lens, whereby reflection of optical pumping radiation from the lens is reduced.

4. In a diode pumped solid state laser:
  a semiconductor diode source of optical pumping radiation;
  an enclosure for enclosing said semiconductive diode source;
  said enclosure having an aperture through which optical pumping radiation passes from the source through the wall of said enclosure;
  an optical transparent window disposed across said aperture in said enclosure;
  a member of solid state lasant material disposed to receive the optical pumping radiation emitted from said diode source and passing through said window; and
  a gradient refractive index lens mounted on said window for imaging the diode source onto the member of solid state lasant material for optically pumping the lasant material.

5. The laser of claim 4 including a thin film of optically transparent adhesive disposed between said window and said lens for bonding said lens directly to said window.

6. The laser of claim 3 wherein said thin film of adhesive has a refractive index value between the refractive index values for the material of said window and that of said refractive index lens, whereby reflection of optical pumping radiation from said lens is reduced.

7. In a diode pumped solid state laser:
  a semiconductor diode source of optical pumping radiation;
  a member of solid state lasant material disposed to receive optical pumping radiation emitted from said diode source for optical pumping of the lasant material and to produce an output laser beam of coherent optical radiation along an optical axis;
  a thermoelectric cooler coupled in heat-exchanging relation with said diode source for cooling said diode source by extracting heat therefrom and transferring the extracted heat to a hot face of said thermoelectric cooler;
  a heat sink structure for heat sinking the heat extracted from said diode as transferred to the hot face of said thermoelectric cooler;
  a tilting structure disposed in heat-exchanging relation between said heat sinking structure and said hot face of said thermoelectric cooler for adjusting the orientation of said diode while conducting heat from the thermoelectric cooler to the heat sink; and
  said tilting structure including a pair of rotatable slidably mating planar faces with the normal to the plane of the planar mating faces being inclined at an angle to the axis of revolution of one of the rotatable mating faces such that by rotating one of said mating faces relative to the other, the orientation of said diode is adjusted.

8. The laser of claim 7 including a ball disposed on the axis of revolution of the mating faces and captured in hemispherical recesses in the mating faces for preventing rectilinear translation of the mating faces, one with respect to the other, in the plane of the mating faces.

9. The laser of claim 8 including a spring structure for spring biasing said mating planar faces into slidable contract, one with respect to the other.

10. The laser of claim 9 wherein said tilting structure includes a pair of wedges, each wedge having one of said mating planar faces, and a pair of pivots for pivotably supporting respective ones of said wedges for rotation about their respective axes of revolution.

* * * * *